(12) United States Patent
Bertrand et al.

(10) Patent No.: US 12,145,738 B2
(45) Date of Patent: Nov. 19, 2024

(54) MULTI-DRIVE UNIT PROPULSION SYSTEM FOR AN AIRCRAFT

(71) Applicant: Pratt & Whitney Canada Corp., Longueuil (CA)

(72) Inventors: Pierre Bertrand, St-Patrice-de-Sherrington (CA); Jean Thomassin, Quebec (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 59 days.

(21) Appl. No.: 17/892,761

(22) Filed: Aug. 22, 2022

(65) Prior Publication Data

US 2024/0059422 A1 Feb. 22, 2024

(51) Int. Cl.
*B64D 35/025* (2024.01)

(52) U.S. Cl.
CPC .................. *B64D 35/025* (2024.01)

(58) Field of Classification Search
CPC ........................ B64D 27/026; B64D 35/025
See application file for complete search history.

(56) References Cited

U.S. PATENT DOCUMENTS

| | | | | |
|---|---|---|---|---|
| 10,227,137 B2* | 3/2019 | Huang | ............ | B64D 27/24 |
| 10,604,266 B2* | 3/2020 | Roever | ............ | B64D 35/08 |
| 10,662,875 B2* | 5/2020 | Lafargue | ............ | F02K 5/00 |
| 10,981,660 B2 | 4/2021 | Mackin | | |
| 11,053,019 B2 | 7/2021 | Mackin | | |
| 11,408,340 B2* | 8/2022 | Lefebvre | ............ | B64D 27/02 |
| 11,535,392 B2* | 12/2022 | LaTulipe | ............ | F16H 57/02 |
| 11,667,391 B2* | 6/2023 | Thomassin | ............ | B64D 27/02 244/55 |
| 11,732,639 B2* | 8/2023 | LaTulipe | ............ | F02B 41/10 60/226.1 |
| 2017/0275009 A1* | 9/2017 | Huang | ............ | B64D 27/24 |
| 2017/0321601 A1* | 11/2017 | Lafargue | ............ | B64D 27/10 |
| 2017/0327238 A1 | 11/2017 | Roever | | |
| 2018/0163558 A1 | 6/2018 | Vondrell | | |
| 2019/0322382 A1 | 10/2019 | Mackin | | |
| 2020/0298988 A1* | 9/2020 | LaTulipe | ............ | B64D 35/08 |

(Continued)

FOREIGN PATENT DOCUMENTS

| | | | | |
|---|---|---|---|---|
| DE | 102013209538 A1 * | 11/2014 | ............ | B64D 27/10 |
| DE | 102020117449 A1 * | 1/2022 | ............ | B64D 35/02 |

(Continued)

OTHER PUBLICATIONS

EP Search Report for EP Patent Application No. 23192780.7 dated Dec. 13, 2023.

*Primary Examiner* — Joseph W Sanderson
(74) *Attorney, Agent, or Firm* — Getz Balich LLC

(57) ABSTRACT

A system is provided for an aircraft. This aircraft system includes a propulsion system, and the propulsion system includes a first thermal engine, a second thermal engine and a first electric machine. The propulsion system is configured to operate the first thermal engine and the second thermal engine, without operating the first electric machine, during a first mode of operation to provide aircraft thrust. The propulsion system is configured to operate the first electric machine and the second thermal engine, without operating the first thermal engine, during a second mode of operation to provide the aircraft thrust.

13 Claims, 11 Drawing Sheets

(56) References Cited

U.S. PATENT DOCUMENTS

| | | | |
|---|---|---|---|
| 2021/0179282 A1 | 6/2021 | Venter | |
| 2021/0179286 A1 | 6/2021 | Harvey | |
| 2021/0300576 A1* | 9/2021 | Thomassin | B64D 35/08 |
| 2021/0355870 A1 | 11/2021 | Lefebvre | |
| 2022/0033097 A1 | 2/2022 | Botti | |
| 2022/0063819 A1 | 3/2022 | Murrow | |
| 2022/0324582 A1* | 10/2022 | LaTulipe | F02B 41/10 |
| 2024/0034479 A1* | 2/2024 | Detweiler | B60L 3/0046 |

FOREIGN PATENT DOCUMENTS

| | | | | |
|---|---|---|---|---|
| WO | WO-2014131914 A1 * | 9/2014 | | B60K 6/48 |
| WO | WO-2017114643 A1 * | 7/2017 | | |

* cited by examiner

MULTI-DRIVE UNIT PROPULSION SYSTEM FOR AN AIRCRAFT

TECHNICAL FIELD

This disclosure relates generally to an aircraft and, more particularly, to a propulsion system for the aircraft.

BACKGROUND INFORMATION

An aircraft propulsion system may include both gas turbine engines and electric motors for driving propulsor rotors. Various arrangements engines and motors are known in the art. While these known engine-motor arrangements have various benefits, there is still room in the art form improvement.

SUMMARY

According to an aspect of the present disclosure, a system is provided for an aircraft. This aircraft system includes a propulsion system, and the propulsion system includes a first thermal engine, a second thermal engine and a first electric machine. The propulsion system is configured to operate the first thermal engine and the second thermal engine, without operating the first electric machine, during a first mode of operation to provide aircraft thrust. The propulsion system is configured to operate the first electric machine and the second thermal engine, without operating the first thermal engine, during a second mode of operation to provide the aircraft thrust.

According to another aspect of the present disclosure, another system is provided for an aircraft. This aircraft system includes a propulsion system, and the propulsion system includes a first thermal engine, a second thermal engine, a first electric machine and a second electric machine. The propulsion system is configured to operate the first thermal engine, the second thermal engine, the first electric machine and the second electric machine to collectively provide a first power for generating aircraft thrust during a first mode of operation. The propulsion system is configured to operate the second thermal engine, the first electric machine and the second electric machine without the first thermal engine to collectively provide a second power for generating the aircraft thrust during a second mode of operation. The second power may be between sixty-five and eighty-five percent of the first power.

According to still another aspect of the present disclosure, another system is provided for an aircraft. This aircraft system includes a propulsor rotor, a thermal engine, an electric machine and a drivetrain. The thermal engine is configured to drive rotation of the propulsor rotor during a first mode of operation. The electric machine is configured to drive rotation of the propulsor rotor during a second mode of operation. The drivetrain couples the thermal engine and the electric machine to the propulsor rotor. The drivetrain includes a fuse link configured to break and permanently decouple the thermal engine from the propulsor rotor during the second mode of operation.

The drivetrain may also include a clutch between the thermal engine and the propulsor rotor. The clutch may be configured to engage when the thermal engine is operational. The clutch may be configured to disengage when the thermal engine is nonoperational.

The fuse link may be configured to break when: the clutch is disengaged; and the electric machine is operating with at least thirty percent power to drive rotation of the propulsor rotor.

When the clutch is disengaged, the fuse link may be configured to: break when the electric machine is operating with at least fifty percent power; and to remain intact when the electric machine is operating with less than the thirty percent power.

The first thermal engine may be subject to an engine inoperative event and the aircraft may be ascending during the second mode of operation.

The second mode may be selected when the first thermal engine is inoperative.

The propulsion system may be configured to only operate the first electric machine for providing the aircraft thrust when the first thermal engine is inoperative.

The propulsion system may also be configured to operate the first thermal engine and the first electric machine during a third mode of operation to provide the aircraft thrust.

The propulsion system may also include a second electric machine. The propulsion system may also be configured to operate the second electric machine during the second mode of operation to provide the aircraft thrust.

The propulsion system may also include a first propulsor rotor configured to be rotationally driven by: the first thermal engine during the first mode of operation; and the first electric machine during the second mode of operation.

The propulsion system may also include a second propulsor rotor configured to be rotationally driven by the second thermal engine during the first mode of operation and the second mode of operation.

The propulsion system may also include a geartrain configured to couple the first thermal engine and the first electric machine to the first propulsor rotor in parallel.

The propulsion system may also include a clutch between the first thermal engine and the first propulsor rotor. The clutch may be engaged during the first mode of operation. The clutch may be disengaged during the second mode of operation.

The propulsion system may also include a fuse link configured to: couple and transmit power between the first thermal engine and the first propulsor rotor during the first mode of operation; and break and disconnect the first thermal engine from the first propulsor rotor during the second mode of operation.

The first electric machine may be configured to power the first thermal engine during startup of the first thermal engine.

The propulsion system may also include a first engine propulsor rotor and a first machine propulsor rotor. The first engine propulsor rotor may be configured to be rotationally driven by the first thermal engine during the first mode of operation. The first machine propulsor rotor may be configured to be rotationally driven by the first electric machine during the second mode of operation.

The propulsion system may also include a second engine propulsor rotor configured to be rotationally driven by the second thermal engine during the first mode of operation and the second mode of operation.

The first thermal engine may be configured as or otherwise include a gas turbine engine, a reciprocating piston engine or a rotary engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
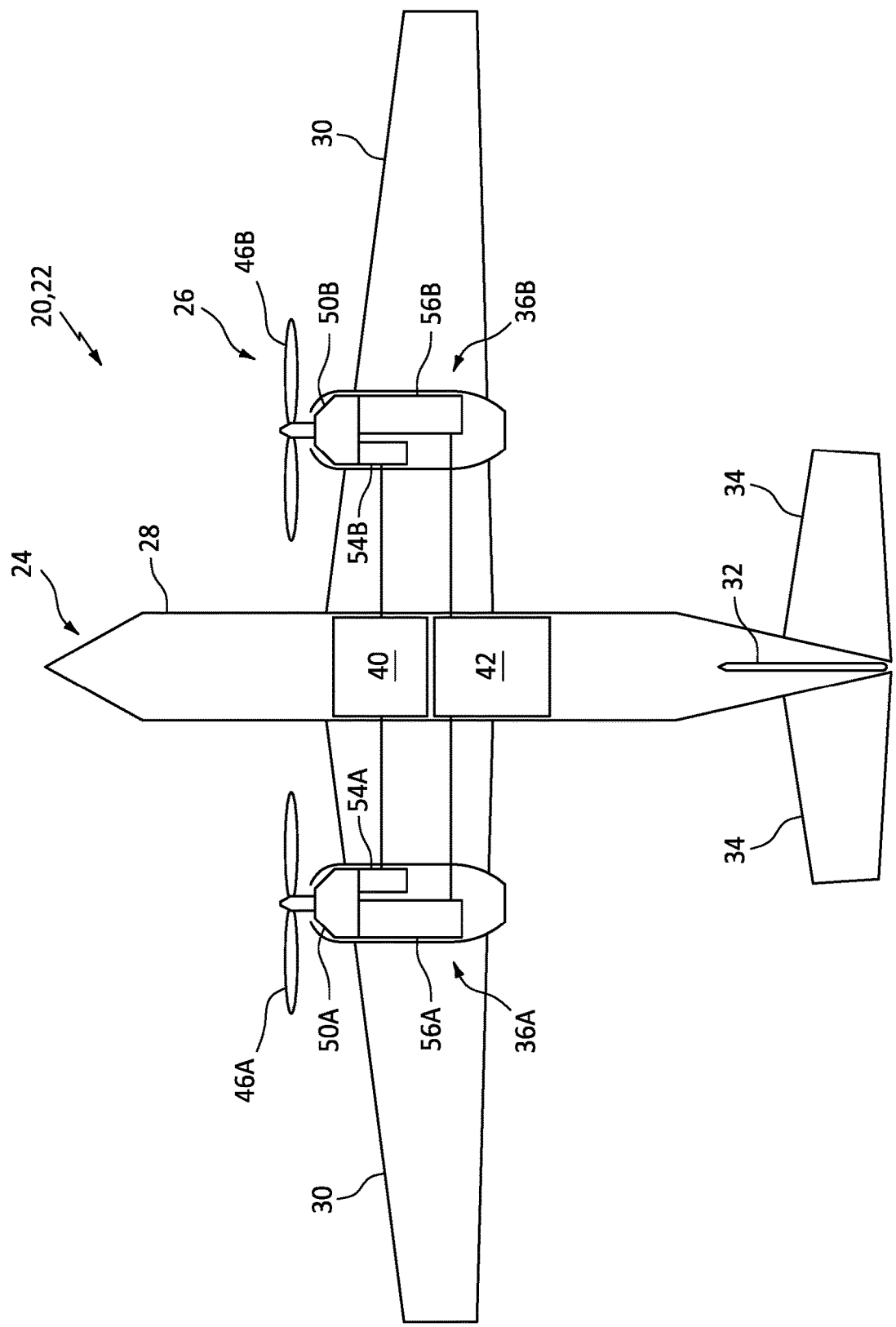
FIG. 1 is a schematic illustration of an aircraft with an aircraft propulsion system.

FIG. 1 illustrates a system 20 for an aircraft 22. For ease of description, the aircraft 22 is shown in FIG. 1 as an airplane. However, the aircraft 22 may alternatively be a helicopter, a drone (e.g., an unmanned aerial vehicle (UAV)), a spacecraft or any other manned or unmanned aerial vehicle. The aircraft system 20 of FIG. 1 includes an airframe 24 and an aircraft propulsion system 26.

The airframe 24 includes an aircraft fuselage 28, a plurality of aircraft wings 30, an aircraft vertical stabilizer 32 and one or more aircraft horizontal stabilizers 34. The wings 30 are arranged to opposing lateral sides of the fuselage 28. Each of the wings 30 is attached to and projects laterally out form the fuselage 28. The vertical stabilizer 32 is arranged at an aft end of the fuselage 28. This vertical stabilizer 32 is attached to and projects vertically out from the fuselage 28. The horizontal stabilizers 34 are arranged to the opposing lateral sides of the fuselage 28. Each of the horizontal stabilizers 34 is attached to and projects laterally out from the fuselage 28. The present disclosure, however, is not limited to such an exemplary airframe arrangement. The horizontal stabilizers 34, for example, may alternatively be attached to and project laterally out from the vertical stabilizer 32. The horizontal stabilizers 34 may also or alternatively be arranged at a front of the fuselage 28 where the aircraft 22 is configured as, for example, a canard aircraft or a tri-surface aircraft. In still other examples, the aircraft 22 may alternatively be configured as a twin fuselage aircraft, a tilt-wing aircraft or a tilt-rotor aircraft.

The aircraft propulsion system 26 is configured to generate aircraft thrust for propelling movement of the aircraft 22 and its airframe 24, for example, in a forward direction. This aircraft propulsion system 26 includes one or more propulsion units 36 (e.g., 36A and 36B). The propulsion units 36A and 36B of FIG. 1 are arranged to the opposing lateral sides of the fuselage 28. Each of the propulsion units 36 of FIG. 1 is attached to a respective one of the wings 30. The present disclosure, however, is not limited to such an exemplary propulsion unit arrangement. The propulsion units 36, for example, may alternatively be attached to the fuselage 28. Furthermore, while the aircraft propulsion system 26 of FIG. 1 is depicted with two of the propulsion units 36, the aircraft propulsion system 26 may alternatively include more than two of the propulsion units 36 where, for example, multiple of the propulsion units 36 may be arranged to each lateral side of the fuselage 28.

Figure 2:
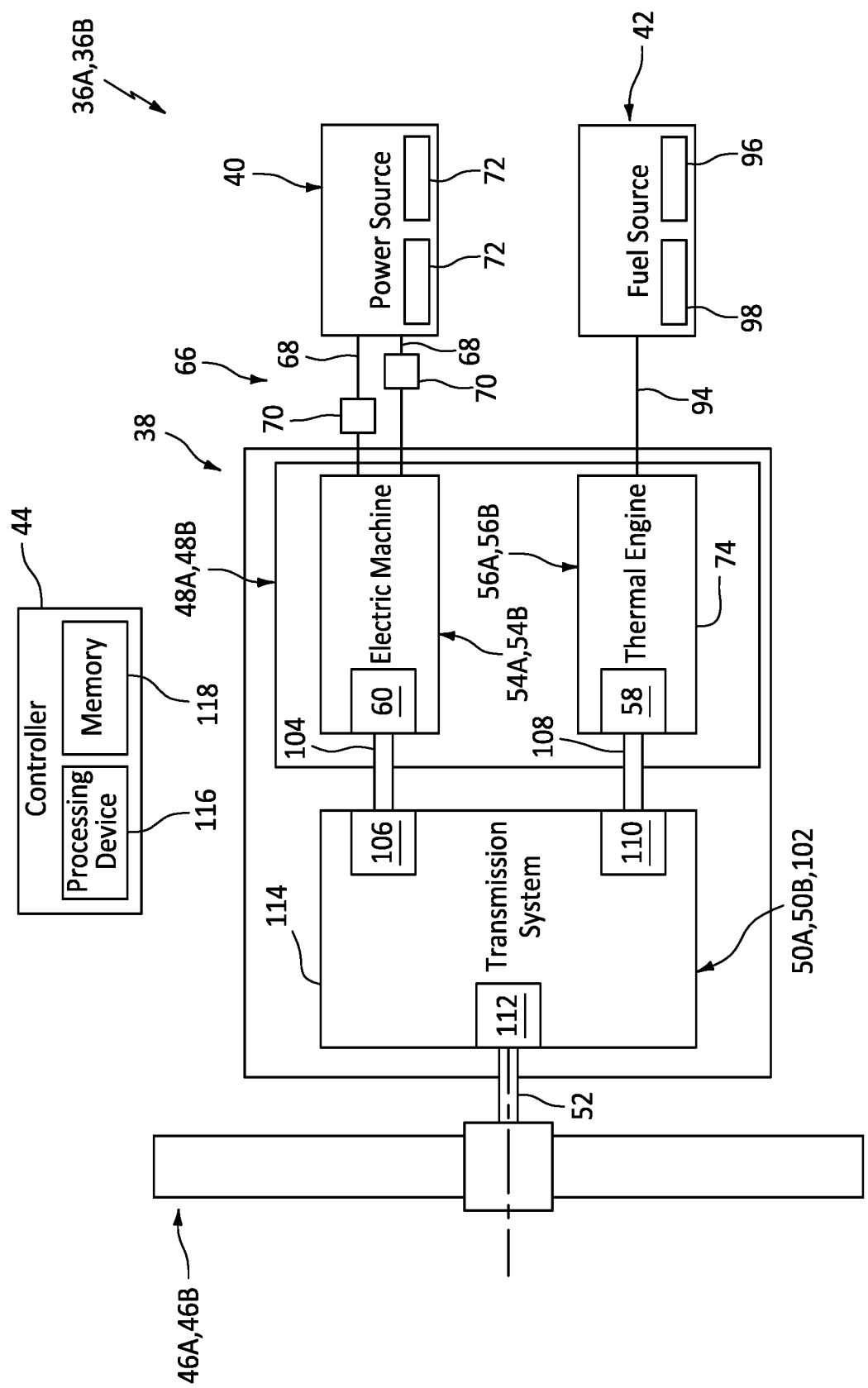
FIG. 2 is a schematic illustration of an aircraft propulsion unit for the aircraft propulsion system.

Referring to FIG. 2, each of the propulsion units 36 may include an aircraft powertrain 38, an (e.g., electric machine) electrical power source 40 and a (e.g., thermal engine) fuel source 42. Each propulsion unit 36 of FIG. 2 also includes a controller 44 for controlling operation of the respective propulsion unit 36. However, in other embodiments, the aircraft propulsion system 26 may include a common controller such this single controller may control operation of some or all of the propulsion units 36. The aircraft propulsion system 26 may also or alternatively include a common power source 40 and/or a common fuel source 42 for some or all of the propulsion units 36.

The powertrain 38 includes at least (or only) one bladed propulsor rotor 46 (e.g., 46A, 46B), a propulsion system powerplant 48 (e.g., 48A, 48B) and a transmission system 50 (e.g., 50A, 50B) for transmitting mechanical power from the powerplant 48 to the propulsor rotor 46. The propulsor rotor 46 may be configured as an open rotor or a ducted rotor. Examples of the open rotor include, but are not limited to, a propeller (see also FIG. 1) and a helicopter rotor (e.g., a main rotor). A non-limiting example of the ducted rotor is a fan rotor. The propulsor rotor 46 of FIG. 2 is coupled to and rotatable with a propulsor shaft 52 and/or another torque transmission device.

The powerplant 48A, 48B includes one or more drive units configured to drive rotation of the propulsor rotor 46. The first drive unit of FIG. 2 is configured as an electric machine 54 (e.g., 54A, 54B). The second drive unit of FIG. 2 is configured as a thermal engine 56 (e.g., 56A, 56B).

The electric machine 54 may be selectively configurable as an electric motor and/or an electric generator. For example, during a motor mode of operation, the electric machine 54 may operate as the electric motor to convert electricity received from the power source 40 into mechanical power. This mechanical power may be utilized for various purposes within the aircraft propulsion system 26 such as, for example, rotating the propulsor rotor 46 and/or rotating a rotating structure 58 within the thermal engine 56 during thermal engine startup. During a generator mode of operation, the electric machine 54 may operate as the electric generator to convert mechanical power received from, for example, the engine rotating structure 58 and/or the propulsor rotor 46 into electricity. This electricity may be utilized for various purposes within the powerplant 48 such as, for example, electrically powering one or more electric components of the powerplant 48 and/or charging the power source 40. The electricity may also or alternatively be utilized for various purposes outside of the powerplant 48 and/or the aircraft propulsion system 26 such as, for example, electrically powering one or more electric components in the airframe 24 (see FIG. 1). Of course, in other embodiments, the electric machine 54 may alternatively be configured as a dedicated electric motor where the electric machine 54 is not also operable as an electric generator.

Figure 3:
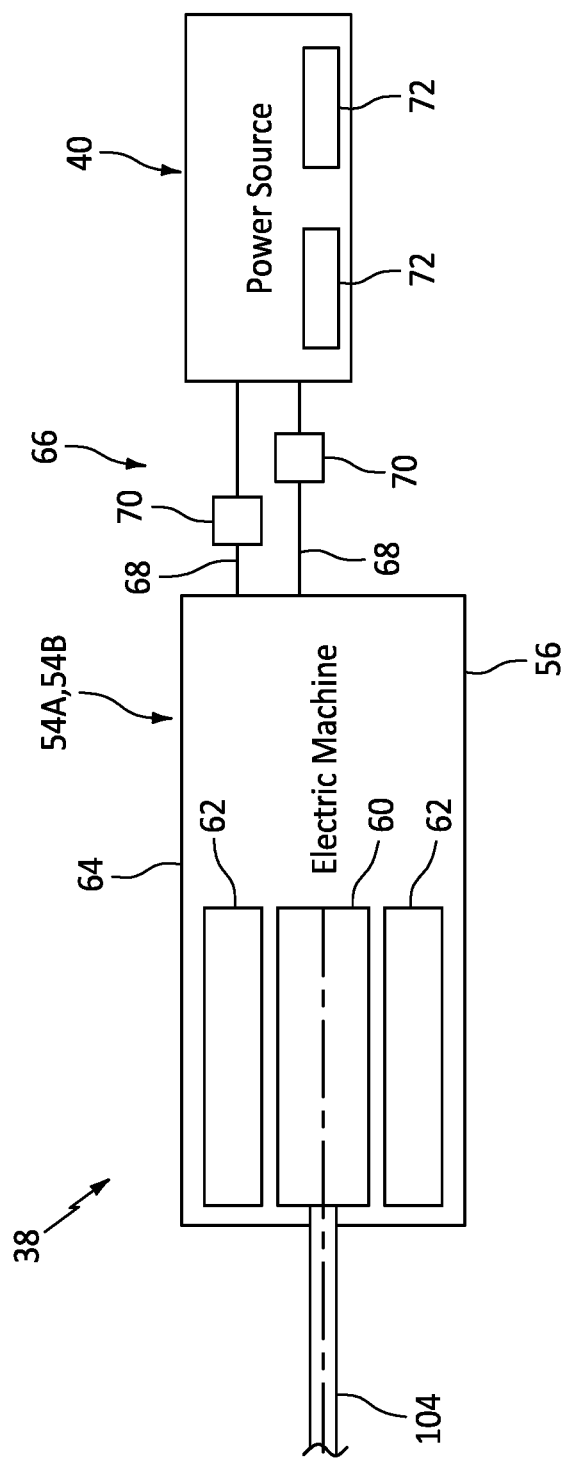
FIG. 3 is a schematic illustration of a portion of the aircraft propulsion unit at an electric machine.

The electric machine 54 of FIG. 3 includes an electric machine rotor 60 and an (e.g., annular) electric machine stator 62. The electric machine 54 also includes an electric machine case 64 that at least partially or completely houses the machine rotor 60 and the machine stator 62.

The machine stator 62 may be radially outboard of and circumscribe the machine rotor 60. Alternatively, the machine rotor 60 may be radially outboard of an circumscribe (or otherwise be positioned relative to) the machine stator 62. The machine rotor 60 is configured to move (e.g., rotate) relative to the machine stator 62. During the motor mode of operation, the machine stator 62 may receive electrical power from the power source 40 and induces an electromagnetic field with the machine rotor 60 that drives rotation of the machine rotor 60. During the generator mode of operation, the machine rotor 60 is rotatably driven (e.g., by the thermal engine) and induces an electromagnetic field with the machine stator 62 that generates electrical power.

The power source 40 is electrically coupled with the electric machine 54 through electrical circuitry 66. This electrical circuitry 66 may include one or more leads 68 (e.g., high voltage lines) and one or more electrical devices 70 for conditioning, metering, regulating and/or otherwise controlling electrical power transfer between the electric machine 54 and the power source 40. Examples of the electrical devices 70 include, but are not limited to, switches, current regulators, converters and buffers.

The power source 40 is configured to store electricity. The power source 40 is also configured to provide the stored electricity to the electric machine 54 and/or receive electricity from the electric machine 54; e.g., during recharging. The power source 40, for example, may be configured as or otherwise include one or more electricity storage devices 72; e.g., batteries, etc.

Referring to FIG. 2, the thermal engine 56 is configured to convert chemical energy stored within fuel into mechanical power. The thermal engine 56 of FIG. 4, for example, is configured as or may otherwise include a gas turbine engine 74. The present disclosure, however, is not limited to such an exemplary thermal engine. The thermal engine 56, for example, may alternatively be configured as or otherwise include a reciprocating piston engine, a rotary engine or any other type of internal combustion (IC) engine with an engine rotating structure 58 capable of driving rotation of the propulsor rotor 46 as described herein. In the case of the reciprocating piston engine, the engine rotating structure 58 may be configured as or otherwise include a crankshaft and one or more pistons coupled to the crankshaft. In the case of the rotary engine, the engine rotating structure 58 may be configured as or otherwise include a driveshaft and an (e.g., triangular) engine rotor (e.g., eccentrically) coupled to the driveshaft. However, for ease of description, the thermal engine 56 may be described or referred to herein as the gas turbine engine 74.

Figure 4:
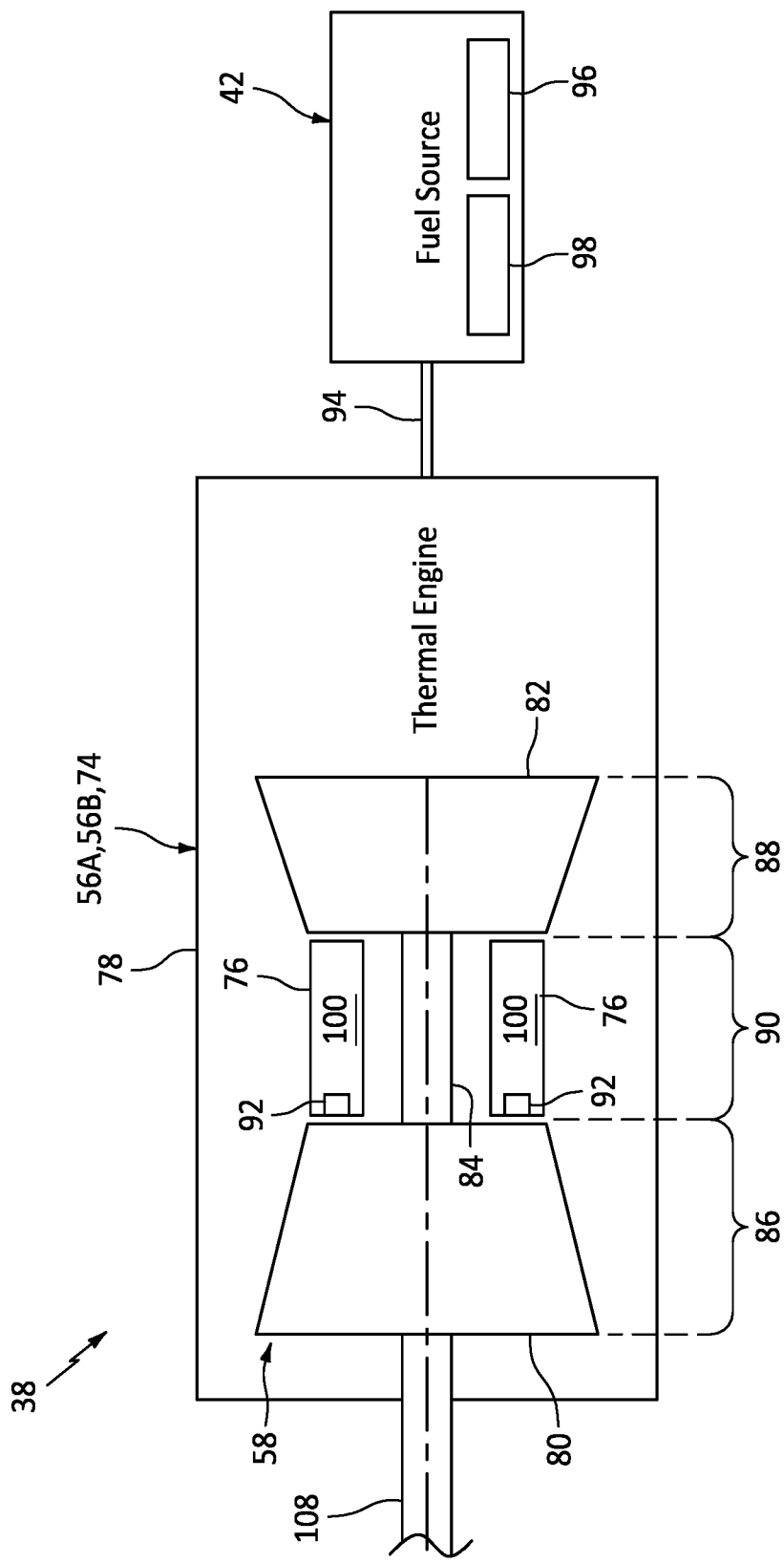
FIG. 4 is a schematic illustration of a portion of the aircraft propulsion unit at a thermal engine.

The gas turbine engine 74 of FIG. 4 includes the engine rotating structure 58, a combustor 76 and an engine case 78 housing the engine rotating structure 58 and the combustor 76. The engine rotating structure 58 includes a bladed compressor rotor 80, a bladed turbine rotor 82 and an engine shaft 84 connecting and rotatable with the compressor rotor 80 and the turbine rotor 82. The compressor rotor 80 is arranged in a compressor section 86 of the gas turbine engine 74. The turbine rotor 82 is arranged within a turbine section 88 of the gas turbine engine 74. The combustor 76 is arranged within a combustor section 90 of the gas turbine engine 74. The gas turbine engine 74, however, is not limited to such an exemplary configuration. The gas turbine engine 74, for example, may include multiple of the rotating structures (e.g., spools) such that, for example, the compressor section 86 includes at least a low pressure compressor (LPC) rotor and a high pressure compressor (HPC) rotor and/or the turbine section 88 includes at least a high pressure turbine (HPT) rotor and a low pressure turbine (LPT) rotor. With multi-rotating structures, the engine rotating structure 58 for driving the propulsor rotor 46 (see FIG. 2) may include each of the elements 80, 82 and 84 or may be configured without the compressor rotor 80 where, for example, the turbine rotor 82 is a free turbine rotor/a power turbine rotor. The gas turbine engine 74 may also or alternatively be configured as a direct drive gas turbine engine or a geared gas turbine engine; e.g., where a geartrain couples together one or more engine rotors.

The fuel source 42 is configured to provide the fuel (e.g., jet fuel, diesel, gasoline, etc.) to the gas turbine engine 74 (the thermal engine). The fuel source 42 of FIG. 4, for example, is fluidly coupled with one or more fuel injectors 92 of the gas turbine engine 74 through at least (or only) one fuel line 94. The fuel source 42 is also configured to store (e.g., contain a quantity of) the fuel before, during and/or after heat engine operation. The fuel source 42 of FIG. 4, for example, includes a fuel reservoir 96 and a fuel flow regulator 98. The fuel flow regulator 98 may be or otherwise include a pump and/or a valve. This fuel flow regulator 98 is configured to direct fuel received from the fuel reservoir 96 to the fuel injectors 92 through the fuel line 94.

During normal/regular operation of the gas turbine engine 74 of FIG. 4, air enters a gas path within the gas turbine engine 74 through an airflow inlet. The gas path extends sequentially through the compressor section 86, the combustor section 90 and the turbine section 88. This air is compressed by the compressor rotor 80 and directed into a combustion chamber 100 of the combustor 76. The fuel received by the gas turbine engine 74 from the fuel source 42 is injected into the combustion chamber 100 by the fuel injectors 92 and mixed with the compressed air to provide a fuel-air mixture. This fuel-air mixture is ignited and combustion products thereof flow through and cause the turbine rotor 82 and, thus, the engine rotating structure 58 to rotate. The rotation of the turbine rotor 82 drives rotation of the compressor rotor 80 and, thus, compression of the air received from the airflow inlet. The rotation of the engine rotating structure 58 also provides mechanical power for driving (e.g., rotating) the propulsor rotor 46 of FIG. 2.

The transmission system 50 of FIG. 2 may be configured as or otherwise include a geartrain 102. This geartrain 102 is configured to motively couple/operatively connect the electric machine 54 and the thermal engine 56 to the propulsor rotor 46. An electric machine coupler 104 (e.g., a shaft), for example, rotatably couples the electric machine 54 and its machine rotor 60 to a first component 106 of the geartrain 102; e.g., a gear, a carrier, a shaft, etc. A thermal engine coupler 108 (e.g., a shaft) rotatably couples the thermal engine 56 and its engine rotating structure 58 to a second component 110 of the geartrain 102; e.g., a gear, a carrier, a shaft, etc. The propulsor shaft 52 rotatably couples the propulsor rotor 46 to a third component 112 of the geartrain 102; e.g., a gear, a carrier, a shaft, etc. These geartrain components 106, 110 and 112 are arranged together within a geartrain case 114 such that mechanical power may be transmitted through the transmission system 50, its geartrain 102 and geartrain components 106, 110 and 112, for example: (1) from the electric machine 54 to the propulsor rotor 46; (2) from the thermal engine 56 to the propulsor rotor 46; (3) from the thermal engine 56 to the electric machine 54; and/or (4) from the electric machine 54 to the thermal engine 56. In the specific embodiment of FIG. 2, the electric machine 54 and the thermal engine 56 are configured in parallel via a drivetrain to drive the propulsor rotor 46, which drivetrain includes at least (or only) the components 50, 52, 104 and 108. The present disclosure, however, is not limited to such an exemplary arrangement.

The controller 44 is configured to control operation of at least the respective propulsion units 36 and its components 50, 54 and 56. The controller 44 of FIG. 2, for example, is in signal communication (e.g., hardwired and/or wirelessly coupled) with one or more actuators and/or other devices (e.g., switches, regulators, etc.) controlling operation of the electric machine 54, and one or more actuators and/or other devices (e.g., switches, regulators, pumps, etc.) controlling operation of the thermal engine 56.

The controller 44 may be implemented with a combination of hardware and software. The hardware may include at least one processing device 116 and a memory 118, which processing device 116 may include one or more single-core and/or multi-core processors. The hardware may also or alternatively include analog and/or digital circuitry other than that described above.

The memory 118 is configured to store software (e.g., program instructions) for execution by the processing device 116, which software execution may control and/or facilitate performance of one or more operations such as those described herein. The memory 118 may be a non-transitory computer readable medium. For example, the memory 118 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 5:
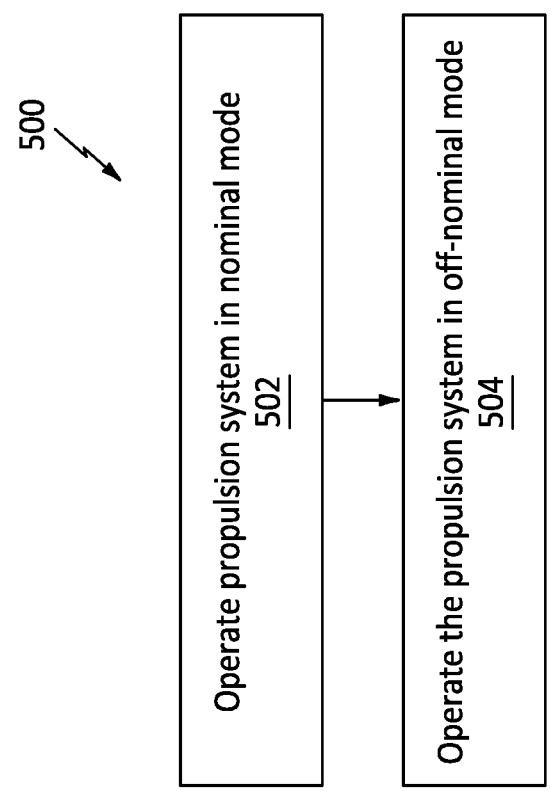
FIG. 5 is a flow diagram of a method for operating an aircraft propulsion system.

FIG. 5 is a flow diagram of a method 500 for operating an aircraft propulsion system. For ease of description, this operating method 500 of FIG. 5 is described herein with reference to the aircraft propulsion system 26 of FIGS. 1 and 2. The operating method 500 of the present disclosure, however, is not limited to such an exemplary aircraft propulsion system.

In step 502, the aircraft propulsion system 26 is operated in a nominal (e.g., full power) mode of operation. For example, as the aircraft 22 is taking off and/or ascending to cruise altitude, the aircraft propulsion system 26 may be operated using substantially or only power provided from the thermal engines 56. The controller(s) 44, for example, may signal the thermal engines 56 to operate and thereby drive rotation of the propulsor rotors 46. By contrast, the controller(s) 44 may signal the electric machines 54 to be non-operational, or operate without powering the propulsor rotors 46 (e.g., operate as the electric generators).

Under certain conditions, an engine-inoperative event such as a one-engine-inoperative (OEI) event may occur prior to, during and/or after aircraft takeoff. During such an engine-inoperative event, one of the thermal engines 56 is inoperative and another one of the thermal engines 56 is operative (e.g., where the aircraft propulsion system 26 includes two of the thermal engines 56). The term "inoperative" may describe a state of engine operation where a thermal engine is non-operational/not running due to, for example, flame out, stall and/or otherwise. The term "operative" may describe a state of engine operation where a thermal engine is (e.g., fully) operational and running. For ease of description, the first thermal engine 56A (e.g., see FIG. 1) is described below as the inoperative thermal engine and the second thermal engine 56B (e.g., see FIG. 1) is described below as the operative thermal engine during the engine-inoperative event. The first thermal engine 56A, however, may alternatively be the operative thermal engine and the second thermal engine 56B may be the inoperative thermal engine. Furthermore, while the engine-inoperative event may occur prior to, during and/or after aircraft takeoff, the engine-inoperative event may also or alternatively occur during one or more other aircraft maneuvers/operations; e.g., aircraft ascent, aircraft cruise, aircraft descent, aircraft landing, etc.

In step 504, in an unlikely event when an engine-inoperative event may occur, the aircraft propulsion system 26 is operated in an off-nominal (e.g., fault) mode of operation. For example, where the first thermal engine 56A experiences/is subject to the engine-inoperative event and is inoperative, the controller 44 for the first propulsion unit 36A may signal the first electric machine 54A to operate as the electric motor and drive rotation of the first propulsor rotor 46A, which is no longer being powered by the first thermal engine 56A. The first electric machine 54A may thereby backup and operate in place of the first thermal engine 56A in the unlikely event of a failure of the first thermal engine 56A. In some embodiments, the first electric machine 54A may be sized and configured to provide a full power backup for the first thermal engine 56A. In other embodiments, the first electric machine 54A may be sized and configured to provide a partial power (e.g., 25%, 50%, 75%) backup for the first thermal engine 56A. In such embodiments, the controller 44 for the second propulsion unit 36B may also (or may not) signal the second electric machine 54B to operate as the electric motor and further drive rotation of the second propulsor rotor 46B. The second electric machine 54B, in other words, may provide supplemental power for driving the second propulsor rotor 46B to at least partially (or completely) compensate for any differential between the (e.g., max or normal) first electric machine operating power and the (e.g., max or normal) first thermal engine operating power.

Figure 6:
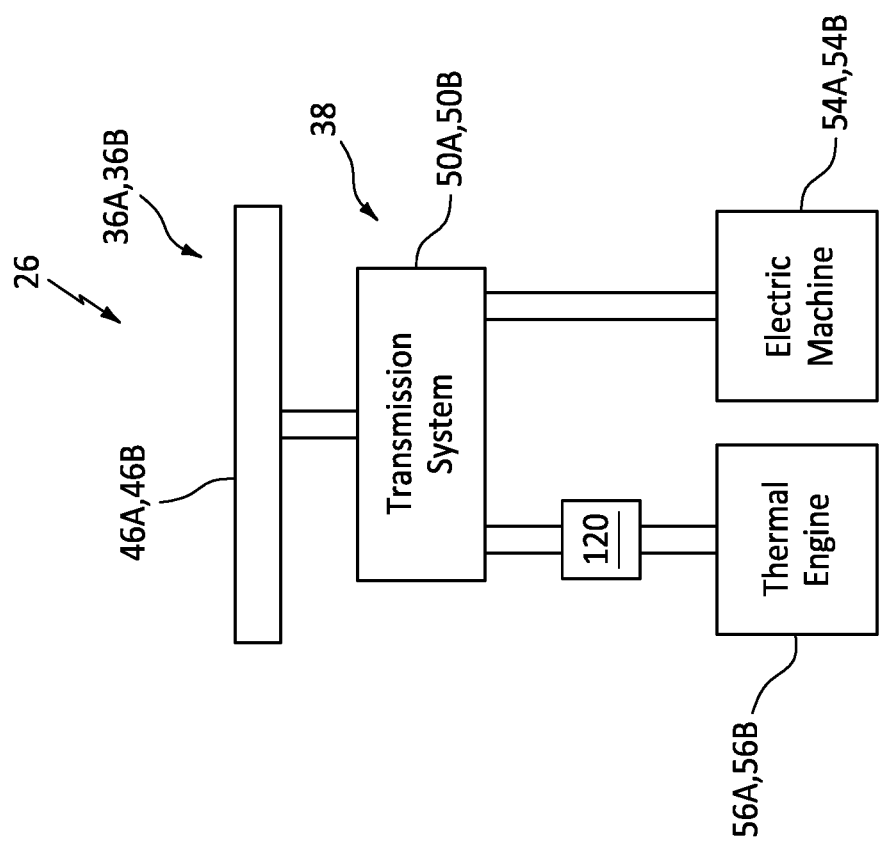
FIG. 6 is a schematic illustration of the aircraft propulsion unit configured with a clutch.

During the nominal mode of operation described above, the thermal engines 56 may be operated to fully power the propulsor rotors 46 and the electric machines 54 may be non-operational, or operated in such a fashion so as not to provide supplemental power to the propulsor rotors 46 (e.g., operated as the electric generators). In some embodiments, the electric machines 54 may be provided as dedicated backups to the thermal engines 56. The electric machine(s) 54, for example, may only be operated to rotationally drive the propulsor rotor(s) 46 when there is a failure of one or more of the thermal engines 56. Otherwise, the electric machines 54 may be non-operational, operate to generate electrical power and/or operate to power the thermal engine (s) 56 during thermal engine startup. In other embodiments, however, the electric machines 54 may also be selectively used to facilitate hybrid operation. One or more of the electric machines 54, for example, may be operated during the nominal mode of operation to provide supplemental power to the propulsor rotors 46. By rotating the propulsor rotors 46 using power provided by both the thermal engines 56 and the electric machines 54, the thermal engines 56 and/or the electric machines 54 may be downsized as compared, for example, to thermal engines or electric motors sized to individually provide max power requirements to a respective propulsor rotor. This size reduction may reduce aircraft propulsor system weight, reduce aircraft propulsor system costs, increase aircraft propulsor system efficiency, etc. The aircraft propulsion system 26 may also or alternatively selectively switch between thermal engine power, electric machine power and combined thermal engine-electric machine power depending upon specific flight conditions, aircraft maneuvers, etc.

Where the thermal engines 56 and the electric machines 54 concurrently operate during nominal operation, a select power split between thermal engine power and electric machine power may be provided. For example, a respective propulsor rotor 46 may receive fifty percent (50%) of its driving power form the respective thermal engine 56 and fifty percent (50%) of its driving power form the respective electric machine 54. With such a fifty-fifty (50:50) power split, in the unlikely event of an engine-inoperative event in one of the thermal engines 56, the total power differential for the aircraft propulsion system 46 is (e.g., only) reduced to seventy-five percent (75%) for the two propulsion unit system. By contrast, if the aircraft propulsion system 26 was (e.g., only) using the two thermal engines 56 during nominal operation, the total power differential for the aircraft propulsion system 46 would be fifty percent (50%). Thus, including and selectively operating the electric machines 54 may reduce requirements for the thermal engines 56. This may also be optimized to meet weight, altitude, temperature (WAT) requirements for an engine-inoperative event during aircraft takeoff. Of course, the specific power split may be adjusted up or down. For example, the total power differential for the aircraft propulsion system 46 may be between sixty-five percent (65%) and eighty-five percent (85%) for the two propulsion unit system.

Where the engine rotating structure 58 of the inoperative first thermal engine 56A remains coupled to the respective propulsor rotor 46 through the transmission system 50, the first electric machine 54A is subject to increased rotational resistance. In other words, to drive rotation of the first propulsor rotor 46A, the first electric machine 54A also needs to drive rotation of the engine rotating structure 58 of the first thermal engine 56. The first electric machine 54A may thereby be oversized to rotate both the first propulsor rotor 46A and the engine rotating structure 58 of the first thermal engine 56A. Alternatively, referring to FIG. 6, each powertrain 38 may also include a clutch 120 between the thermal engine 56 and the propulsor rotor 46 and, more particularly, between the thermal engine 56 and the transmission system 50. This clutch 120 is configured to uncouple the thermal engine 56 from the respective propulsor rotor 46/the transmission system 50 such that the electric machine 54 may be sized to drive rotation of the respective propulsor rotor 46 and not both the propulsor rotor 46 and the engine rotating structure 58. This may be particularly useful where the engine rotating structure 58 becomes seized, bound and/or otherwise damaged during the engine-inoperative event.

The clutch 120 may be configured as an overrunning (e.g., sprag) clutch, a toothed flange clutch, a friction clutch or another other type of clutch capable of selectively coupling and uncoupling the thermal engine from the respective propulsor rotor 46. The clutch 120 of FIGS. 7A and 7B, for example, includes a toothed first clutch plate 122 and a toothed second clutch plate 124. When these clutch plates 122 and 124 are brought together to engage the clutch 120 (see FIG. 7A), teeth 126 on the first clutch plate 122 are mated with (e.g., meshed with) teeth 128 on the second clutch plate 124. The first clutch plate 122 is thereby rotationally fixed to the second clutch plate 124, and the clutch 120 is operable to transmit power between the thermal engine 56 and the respective powertrain components 50, 54. By contrast, when the clutch plates 122 and 124 are moved apart from one another to disengage the clutch 120 (see FIG. 7B), the first clutch plate teeth 126 no longer mesh with the second clutch plate teeth 128. The first clutch plate 122 may thereby be operable to rotate independent of the second clutch plate 124, and the clutch 120 may no longer be operable to transmit power between the thermal engine 56 and the respective powertrain components 50, 54.

Figure 7A:
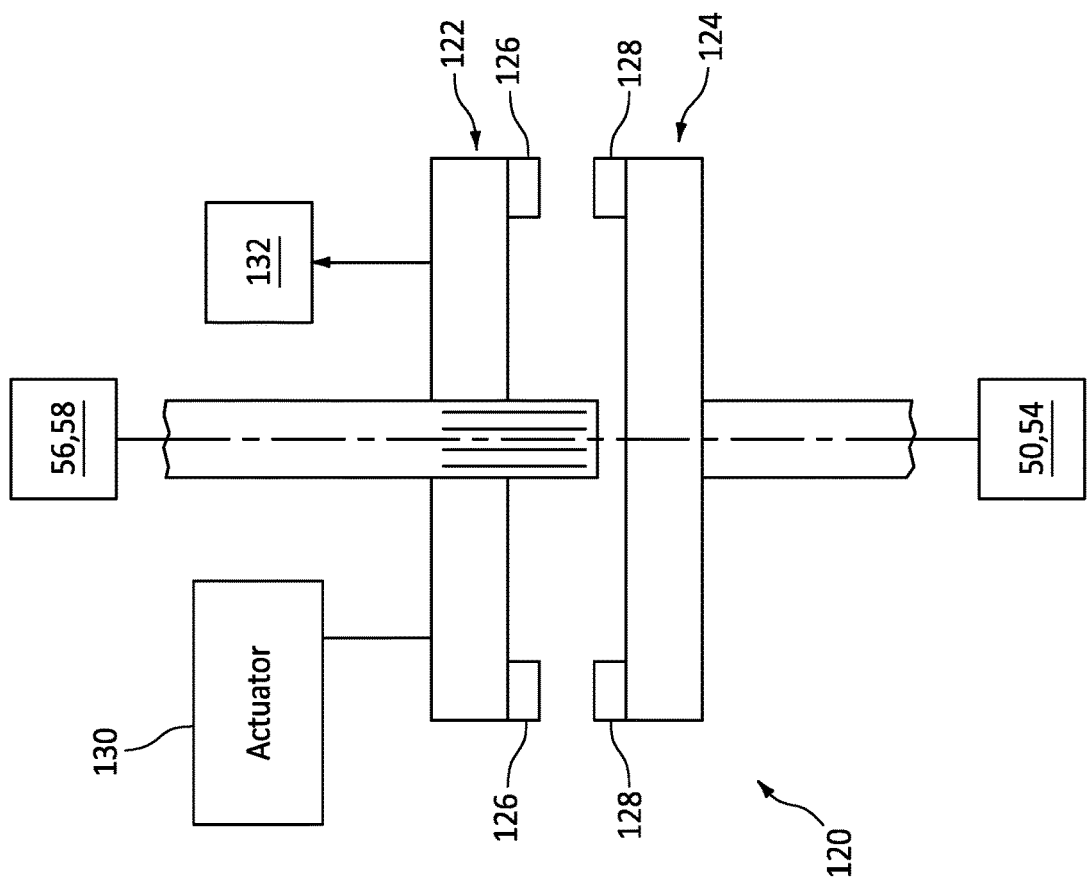
FIG. 7A is a schematic illustration of a portion of a powertrain with the clutch engaged.
Figure 7B:
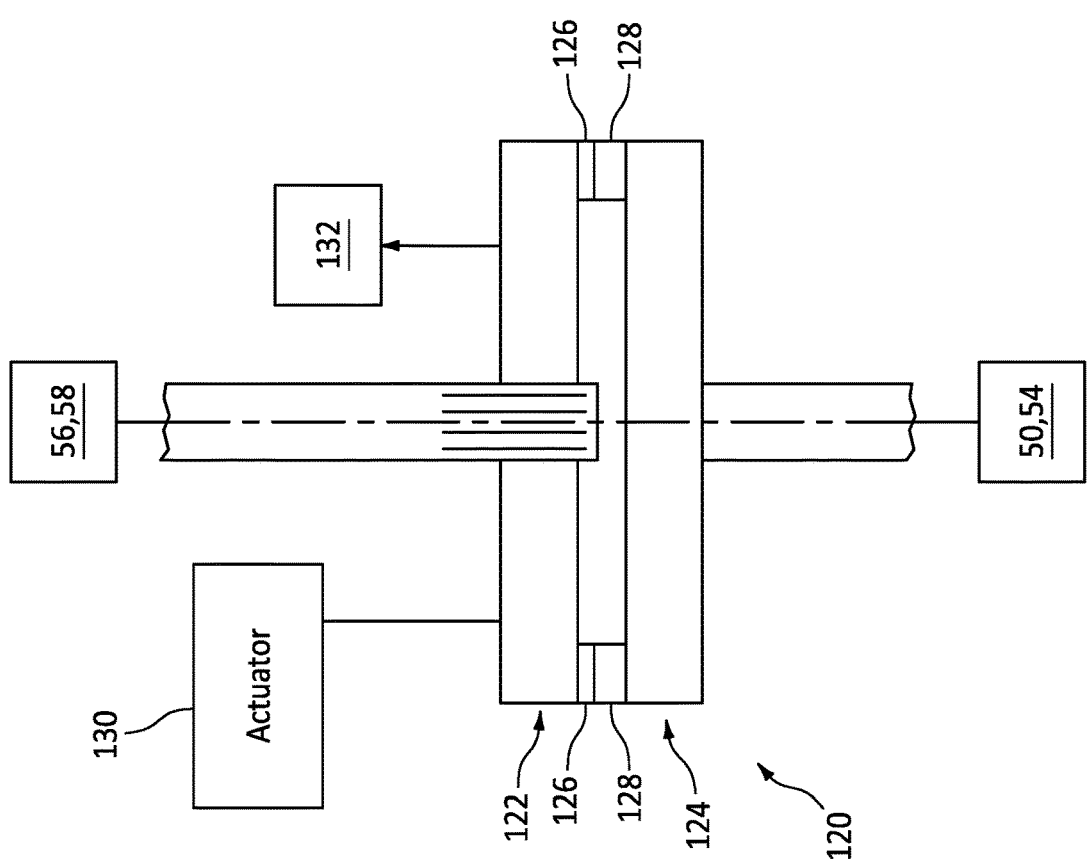
FIG. 7B is a schematic illustration of a portion of the powertrain of FIG. 7A with the clutch disengaged.

The movement of the first clutch plate 122 (or alternatively movement of the plate 124, or movement of both plates 122 and 124) between the engaged position of FIG. 7A and disengaged position of FIG. 7B may be actuated by an actuator 130 (schematically shown). The actuator 130 of FIGS. 7A and 7B is configured as a hydraulic actuator that receives pressurized fluid form (e.g., a pump of or otherwise powered by) the thermal engine 56, or another source. When the thermal engine 56 is operational and provides the actuator 130 with the pressurized fluid, the clutch 120 may be engaged. However, when the thermal engine 56 is non-operational or inoperable, the thermal engine 56 does not provide the actuator 130 with the pressurized fluid and the clutch 120 disengages. The clutch 120, for example, may include a spring element 132 (schematically shown) which biases the clutch plates 122 and 124 away from one another. Of course, various other clutch actuators are known in the art, and the present disclosure is not limited to any particular ones thereof. For example, the clutch actuator may alternatively be configured as or include an electric motor.

Figure 8A:
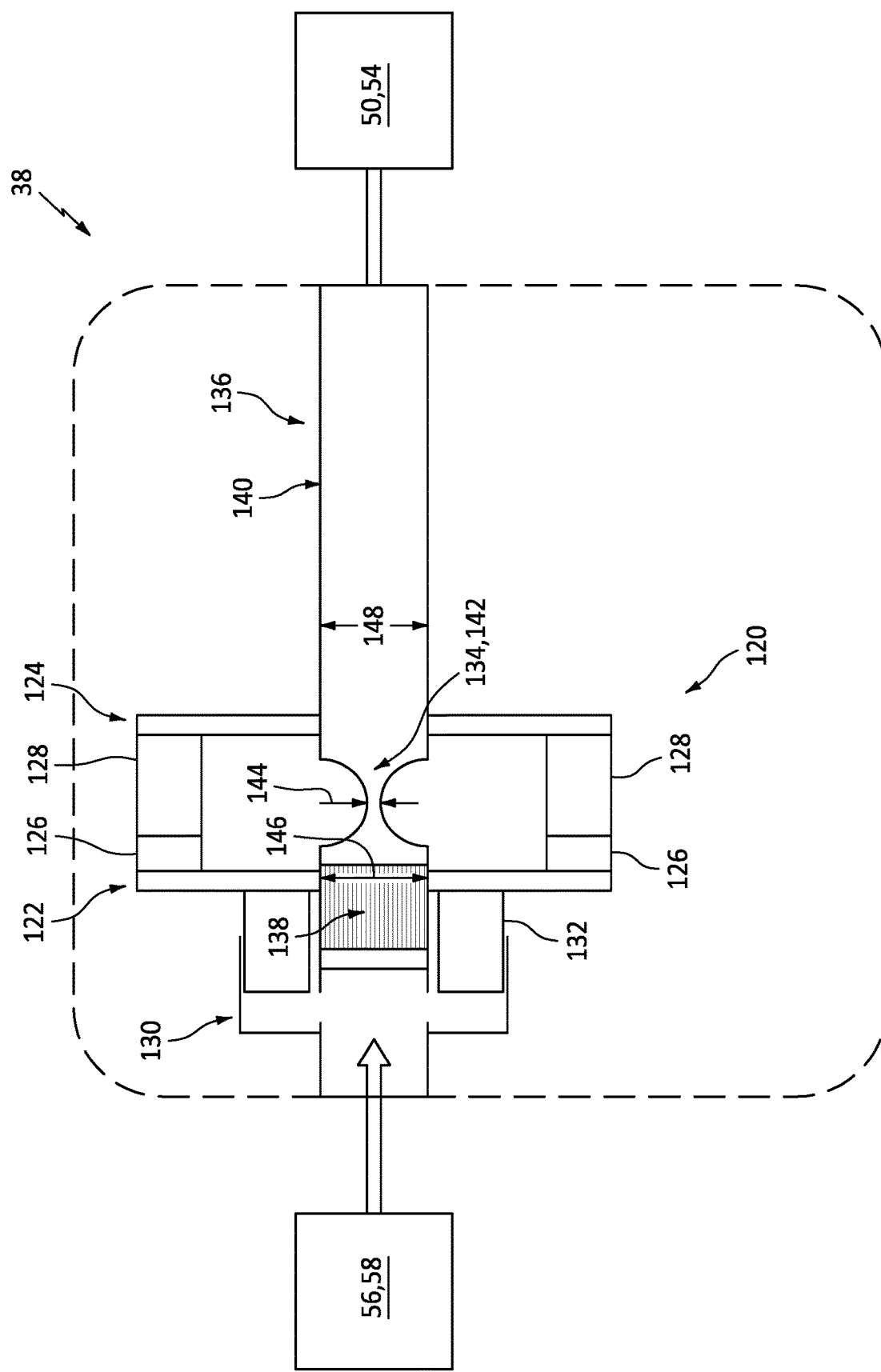
FIG. 8A is a schematic illustration of a portion of the powertrain with the clutch and a fuse link, where the clutch is engaged and the fuse link is intact.
Figure 8B:
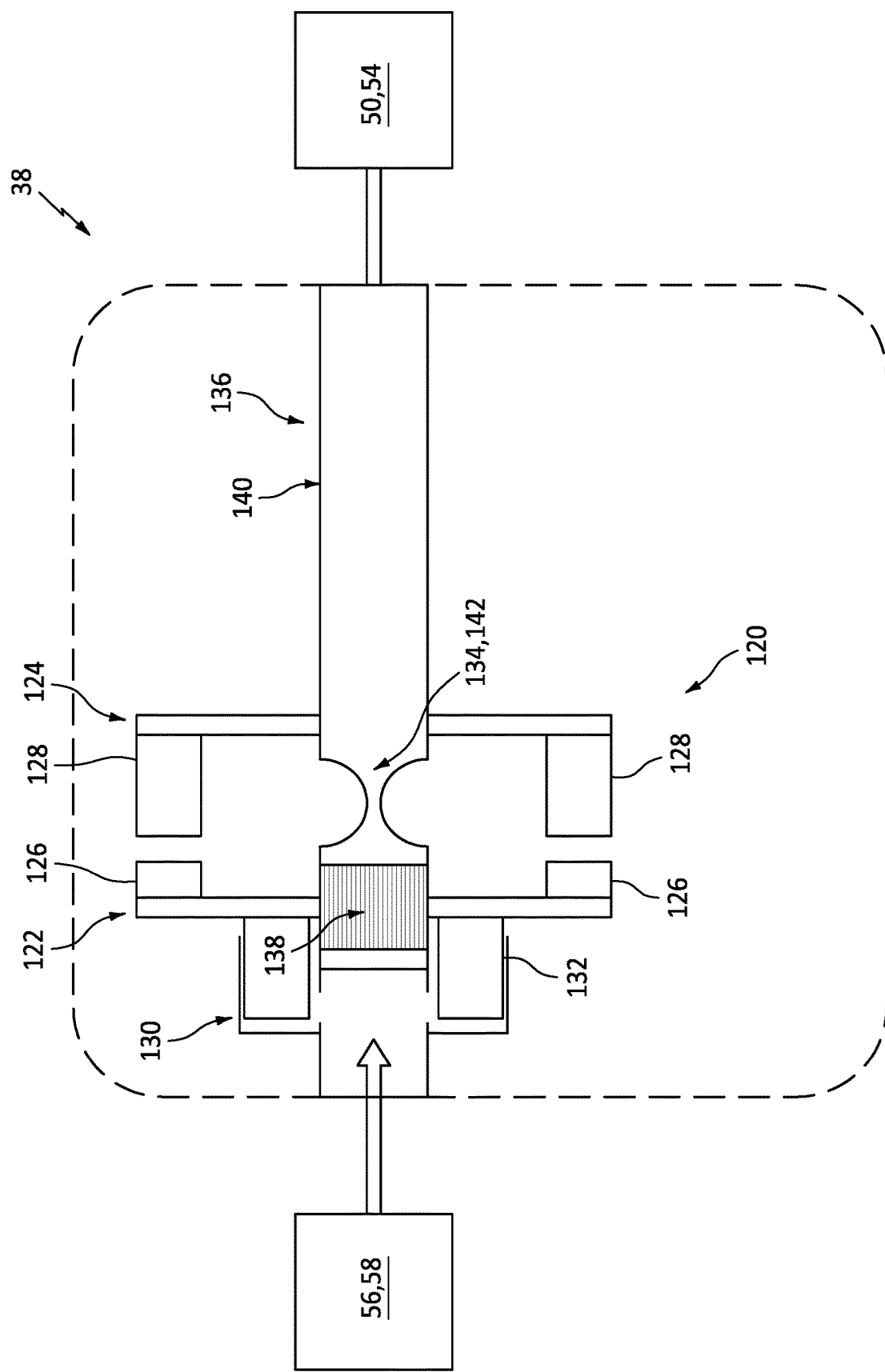
FIG. 8B is a schematic illustration of a portion of the powertrain of FIG. 8A with the clutch and the fuse link, where the clutch is disengaged and the fuse link is intact.
Figure 8C:
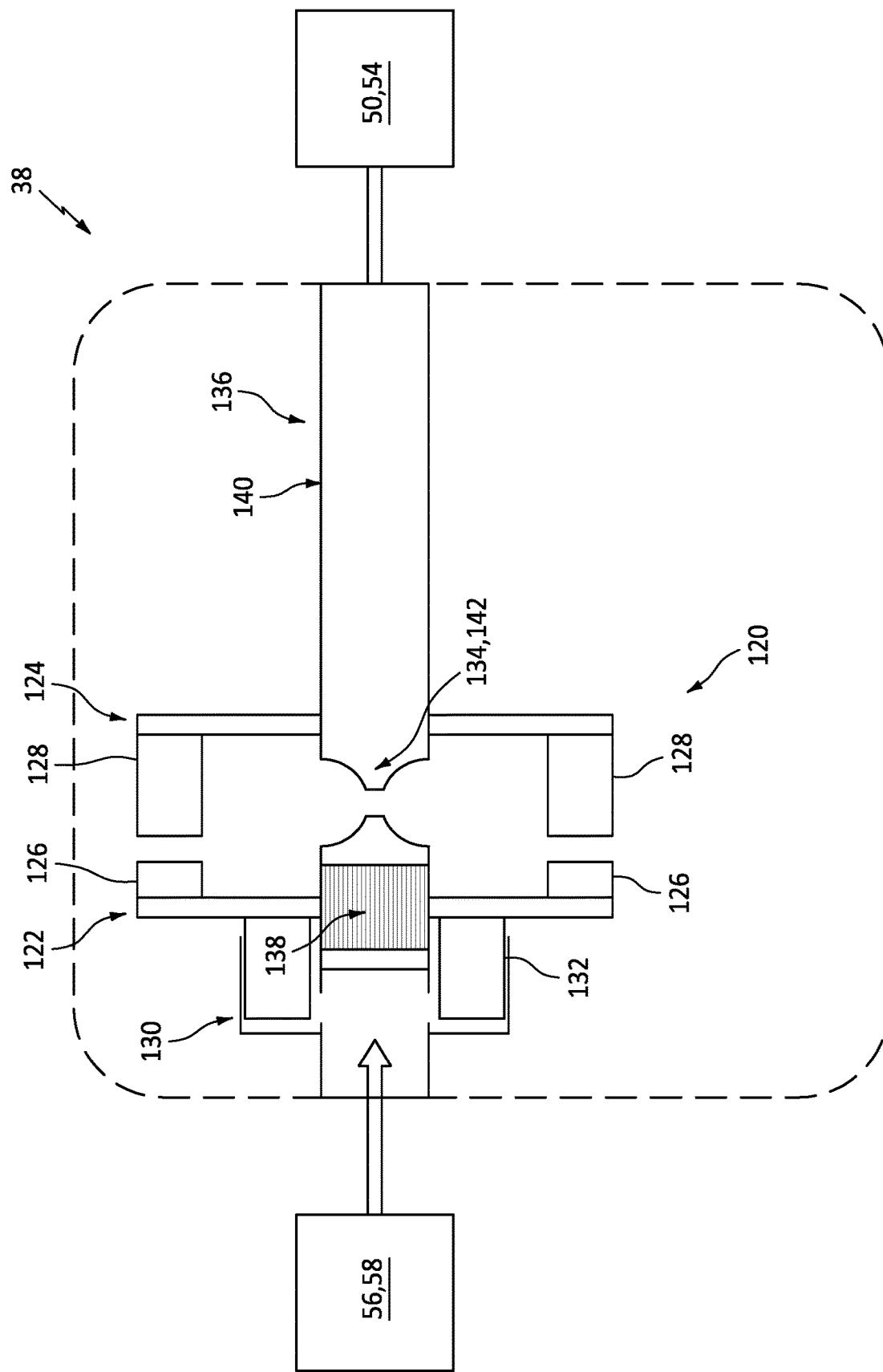
FIG. 8C is a schematic illustration of a portion of the powertrain of FIG. 8A with the clutch and the fuse link, where the clutch is disengaged and the fuse link is broken.

In some embodiments, referring to FIGS. 8A-C, the powertrain 38 may also or alternatively include a fuse link 134. This fuse link 134 may be incorporated into a shaft 136. The shaft 136 of FIGS. 8A-C, for example, includes a first (e.g., clutch) shaft section 138, a second (e.g., clutch) shaft section 140 and an intermediate shaft section 142 connected to the first shaft section 138 and the second shaft section 140. The first shaft section 138 may be splined such that the first clutch plate 122 may slide axially along the first shaft section 138, but may be rotationally fixed to the first shaft section 138. The second clutch plate 124 may be rotationally and rotationally fixedly connected the second shaft section 140. The intermediate shaft section 142 extends axially between and to the first shaft section 138 and the second shaft section 140.

Referring to FIG. 8A, the intermediate shaft section 142 may have a smaller width 144 (e.g., diameter) than widths 146 and 148 of the first and the second sections 138 and 140. The intermediate section width 144, for example, may be less than one-half (½), one-third (⅓), one-fourth (¼) or one-fifth (⅕) of the first section width 146 and/or the second section width 148. This intermediate shaft section 142 may thereby form the fuse link 134 in the shaft 136. The intermediate section width 144, for example, may be sized large enough such that relatively low power (e.g., less than 50%, 40% or 30% of electric machine power) may be transferred from the electric machine 54 through the shaft 136 and its fuse link 134 to the rotating assembly 58 during thermal engine startup when the clutch 120 has not yet been engaged; e.g., see FIG. 8B. Note, referring to FIGS. 8A and 8B, the intermediate shaft section 142 also provides a synchronization function for the clutch 120 to facilitate the clutch plates 122 and 124 rotating at a common speed for easier clutch plate engagement and disengagement. The intermediate section width 144, however, may be sized small enough such that higher power (e.g., more than 50%, 40% or 30% of electric machine power) transferred from the electric machine 54 into the powertrain 38 for driving rotation of the propulsor rotor 46 (e.g., during the off-nominal mode of operation) when the clutch 120 has been disengaged will shear the intermediate shaft section 142. The first shaft section 138 may thereby break off from the second shaft section 140 such that these shaft sections 138 and 140 of the shaft 136 may rotate independent of one another. The shearing thereby (e.g., permanently) decouples the thermal engine 56 from the propulsor rotor 46 and the electric machine 54.

Figure 9:
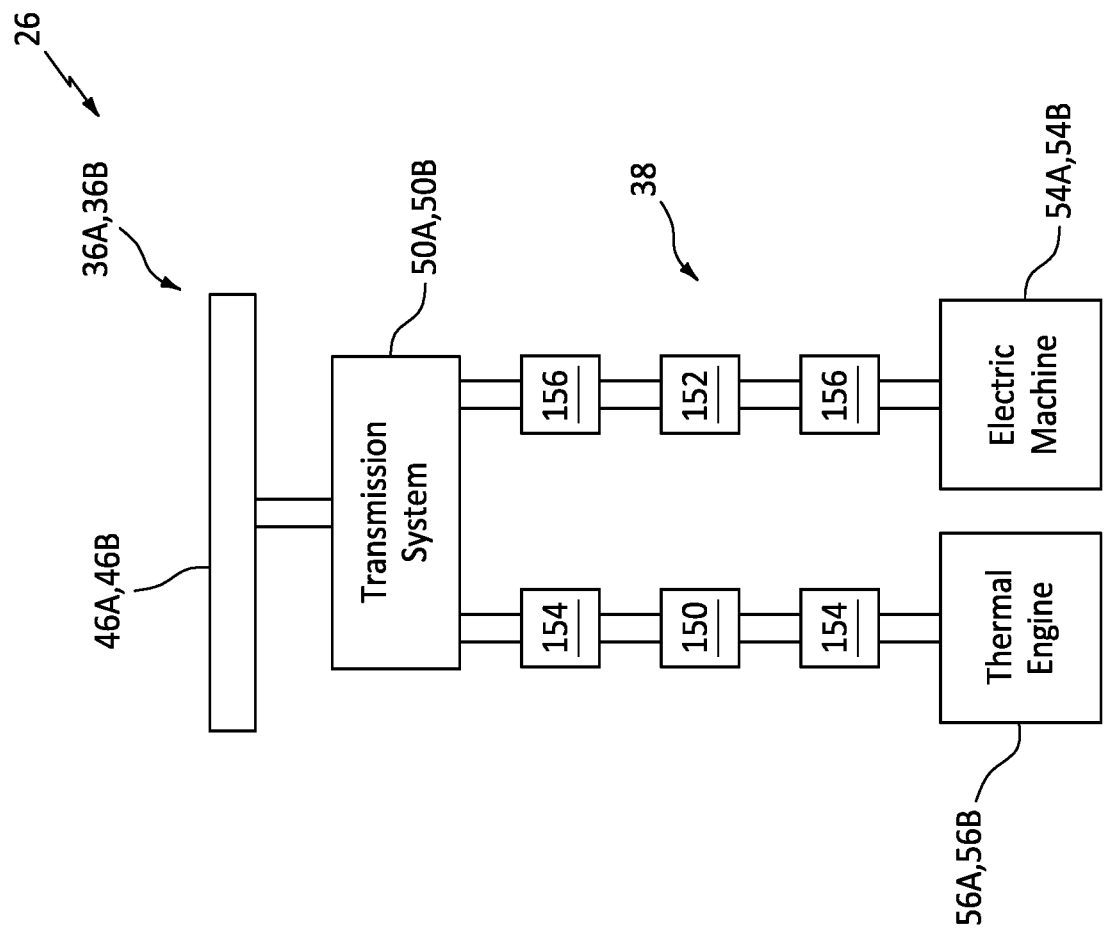
FIG. 9 is a schematic illustration of the aircraft propulsion unit configured with one or more additional powertrain components.

In some embodiments, referring to FIG. 9, the powertrain 38 may also include one or more additional geartrains 150 and/or 152; e.g., reduction geartrains, epicyclic geartrains, etc. The geartrain 150 may be arranged between and couple the thermal engine 56 to the transmission system 50. The geartrain 152 may be arranged between and coupled the electric machine 54 to the transmission system 50. The clutch 120 and the fuse link 134 (when included) may be arranged at one or more various locations 154 within the powertrain 38. The powertrain 38 may also (or may not) include a clutch along the electric machine side of the powertrain 38 at one or more various locations 156 in certain embodiments. This clutch may be configured the same as (or different than) the clutch 120.

Figure 10:
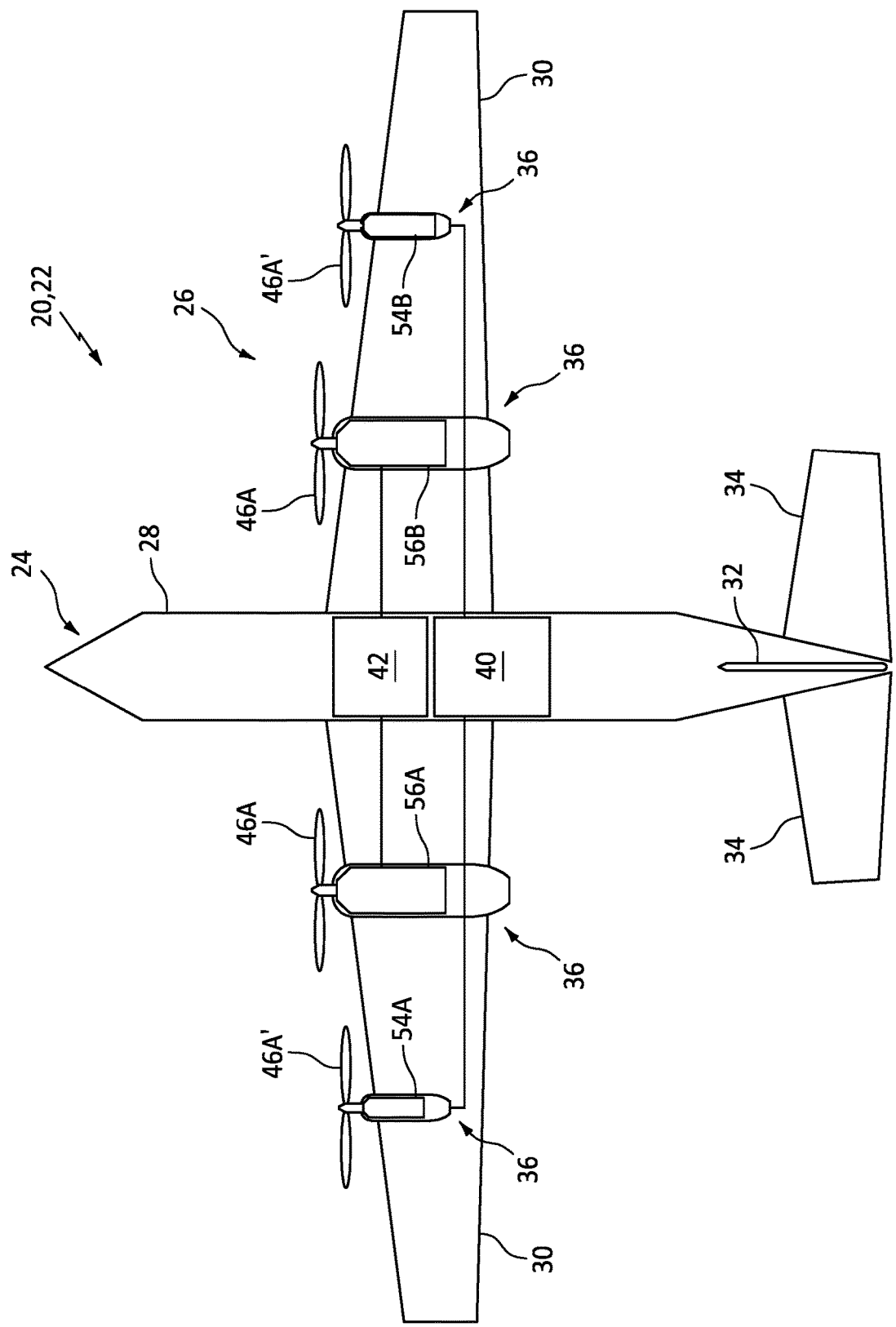
FIG. 10 is a schematic illustration of the aircraft configured with another aircraft propulsion system arrangement.

In some embodiments, each of the thermal engines 56 may be paired with and coupled to a respective one of the electric machines 54 through the transmission system 50. With this configuration, the respective electric machine 54 and the respective thermal engine 56 are configured to drive rotation of a common propulsor rotor 46. In other embodiments however, referring to FIG. 10, each drive unit 36 may be configured to drive its own propulsor rotor 46. More particularly, each of the thermal engines 56A and 56B may rotationally drive a respective thermal engine propulsor rotor 46A and 46B. Each of the electric machines 54A and 54B may rotationally drive a respective electric machine (e.g., electric motor) propulsor rotor 46A' and 46B'. However, while each drive unit 36 may be associated with and operable to drive its own propulsor rotor 46, the thermal engines 56 and the electric machines 54 may be operated as described above. For example, during the nominal mode of operation, the thermal engines 56A and 56B may rotationally drive their respective propulsor rotors 46A and 46B to provide (e.g., all) aircraft thrust. However, during the off-nominal mode of operation where the first thermal engine 56A is inoperable for example, the first electric machine 54A may drive its propulsor rotor 46A' to accommodate for the loss in the aircraft thrust from the first thermal engine propulsor 46A. When one or more of the drive units 36 are non-operational and/or inoperative, blades of the respective propulsor rotor 46 may be feathered and/or otherwise adjusted to reduce drag.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
 a propulsion system including a first thermal engine, a second thermal engine, a first electric machine, a first propulsor rotor, and a clutch;
 the propulsion system configured to operate the first thermal engine and the second thermal engine, without operating the first electric machine, during a first mode of operation to provide aircraft thrust;
 the propulsion system configured to operate the first electric machine and the second thermal engine, without operating the first thermal engine, during a second mode of operation to provide the aircraft thrust,
 the first propulsor rotor configured to be rotationally driven by the first thermal engine during the first mode of operation, and by the first electric machine during the second mode of operation; and
 the clutch comprising a fuse link configured to:
 couple and transmit power between the first thermal engine and the first propulsor rotor during the first mode of operation; and
 break and disconnect the first thermal engine from the first propulsor rotor during the second mode of operation.

2. The system of claim 1, wherein the second mode is selected when the first thermal engine is inoperative.

3. The system of claim 1, wherein the propulsion system is further configured to operate the first thermal engine and the first electric machine during a third mode of operation to provide the aircraft thrust.

4. The system of claim 1, wherein
 the propulsion system further includes a second electric machine; and
 the propulsion system is further configured to operate the second electric machine during the second mode of operation to provide the aircraft thrust.

5. The system of claim 1, wherein the propulsion system further includes a second propulsor rotor configured to be rotationally driven by the second thermal engine during the first mode of operation and the second mode of operation.

6. The system of claim 1, wherein the propulsion system further includes a geartrain configured to couple the first thermal engine and the first electric machine to the first propulsor rotor in parallel.

7. The system of claim 1, wherein the clutch is between the first thermal engine and the first propulsor rotor, the clutch is engaged during the first mode of operation, and the clutch is disengaged during the second mode of operation.

8. The system of claim 1, wherein the first electric machine is configured to power the first thermal engine during startup of the first thermal engine.

9. The system of claim 1, wherein the first thermal engine comprises one of a gas turbine engine, a reciprocating piston engine and a rotary engine.

10. A system for an aircraft, comprising:
 a propulsor rotor;
 a thermal engine configured to drive rotation of the propulsor rotor during a first mode of operation;
 an electric machine configured to drive rotation of the propulsor rotor during a second mode of operation; and
 a drivetrain coupling the thermal engine and the electric machine to the propulsor rotor, the drivetrain comprising a clutch, and the clutch comprising a fuse link configured to break and permanently decouple the thermal engine from the propulsor rotor during the second mode of operation.

11. The system of claim 10, wherein
 the clutch is between the thermal engine and the propulsor rotor;
 the clutch is configured to engage when the thermal engine is operational; and
 the clutch is configured to disengage when the thermal engine is nonoperational.

12. The system of claim 11, wherein the fuse link is configured to break when
the clutch is disengaged; and
the electric machine is operating with at least thirty percent power to drive rotation of the propulsor rotor.

13. The system of claim 11, wherein, when the clutch is disengaged, the fuse link is configured to
break when the electric machine is operating with at least fifty percent power; and
to remain intact when the electric machine is operating with less than the thirty percent power.

* * * * *